United States Patent
Knapp (10) Patent No.: US 8,010,636 B2
(45) Date of Patent: Aug. 30, 2011

(54) GENERIC BROADBAND APPLICATION AND PLUG-INS

(75) Inventor: Chris H Knapp, Colorado Springs, CO (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 267 days.

(21) Appl. No.: 12/326,251

(22) Filed: Dec. 2, 2008

(65) Prior Publication Data

US 2010/0138547 A1 Jun. 3, 2010

(51) Int. Cl.
*G06F 15/177* (2006.01)

(52) U.S. Cl. ............ 709/220; 709/221; 709/222; 710/8; 710/62; 710/63; 713/2

(58) Field of Classification Search ................ 710/8, 62, 710/63; 713/2; 709/220, 221, 222

See application file for complete search history.

(56) References Cited

U.S. PATENT DOCUMENTS

| | | | | |
|---|---|---|---|---|
| 5,630,076 A * | 5/1997 | Saulpaugh et al. | ........... | 710/104 |
| 5,802,365 A * | 9/1998 | Kathail et al. | ........... | 719/321 |
| 5,974,474 A * | 10/1999 | Furner et al. | ............ | 710/8 |
| 6,493,770 B1 * | 12/2002 | Sartore et al. | ............ | 710/8 |
| 6,671,749 B2 * | 12/2003 | Williams et al. | ........... | 710/10 |
| 6,754,722 B2 * | 6/2004 | Herzi | ............ | 710/8 |
| 7,047,534 B2 * | 5/2006 | Sadovsky et al. | ............ | 719/322 |
| 7,269,832 B2 * | 9/2007 | Bodin et al. | ............ | 719/321 |
| 7,322,035 B2 * | 1/2008 | Sadovsky et al. | ............ | 719/321 |
| 7,418,716 B2 * | 8/2008 | Montecalvo et al. | ......... | 719/321 |
| 7,536,699 B2 * | 5/2009 | Sadovsky et al. | ............ | 719/322 |
| 7,599,304 B2 * | 10/2009 | Desai et al. | ............ | 370/251 |
| 7,617,502 B2 * | 11/2009 | Sprague | ............ | 719/322 |
| 7,665,071 B1 * | 2/2010 | Roles et al. | ............ | 717/130 |
| 7,673,303 B2 * | 3/2010 | Sadovsky et al. | ............ | 718/101 |
| 7,725,613 B2 * | 5/2010 | Bhardwaj et al. | ............ | 710/8 |
| 2002/0004852 A1 * | 1/2002 | Sadovsky et al. | ............ | 709/321 |
| 2003/0046447 A1 * | 3/2003 | Kouperchliak et al. | ....... | 709/321 |
| 2004/0088718 A1 * | 5/2004 | Sprague | ............ | 719/322 |
| 2005/0038878 A1 * | 2/2005 | McGee et al. | ............ | 709/220 |
| 2005/0132352 A1 * | 6/2005 | Shen | ............ | 717/174 |
| 2005/0278461 A1 * | 12/2005 | Ohta | ............ | 710/8 |
| 2007/0169116 A1 * | 7/2007 | Gujarathi et al. | ............ | 717/174 |
| 2007/0201386 A1 * | 8/2007 | Desai et al. | ............ | 370/278 |
| 2007/0239903 A1 * | 10/2007 | Bhardwaj et al. | ............ | 710/8 |
| 2007/0277029 A1 * | 11/2007 | Rao et al. | ............ | 713/2 |
| 2008/0276012 A1 * | 11/2008 | Mesa et al. | ............ | 710/13 |
| 2008/0285755 A1 * | 11/2008 | Camus et al. | ............ | 380/270 |

* cited by examiner

*Primary Examiner* — Dohm Chankong (57) ABSTRACT

A device may receive a broadband card, dynamically load a non-generic plug-in to detect the broadband card, determine whether the loaded non-generic plug-in detects the broadband card, dynamically load a generic plug-in when the loaded non-generic plug-in does not detect the broadband card, and use the generic plug-in to certify the broadband card.

11 Claims, 9 Drawing Sheets

USAGE COUNTERS

| | SESSION | TOTAL |
|---|---|---|
| Sent: | 0 | 85939 |
| Received: | 0 | 27263 |
| Total: | 0 | 113202 |
| Last Reset: | 9/25/2008 3:06 PM | Reset Total |

SIM MANAGEMENT

SIM Status: READY

—PIN Required to use SIM?—

○ NO   ● YES

CHANGE SIM PIN

CARD PROPERTIES

—Card Details—

| | |
|---|---|
| Manufacturer: | Option N.V. |
| Model: | Globe Trotter 3G+ |
| Serial Number: | 359848002658929.NF2376E0BN |
| Port: | Option N.V. |
| Firmware Version: | 3.17.0Hd (Date: Apr 11 2006, Time: 13:19:33) |
| Power Source: | Battery |
| Card Status: | Mobile Data Access Card Okay |

GENERIC BROADBAND APPLICATION AND PLUG-INS

BACKGROUND INFORMATION

Today's mobile devices may use different types of components to communicate with other devices via the Internet. For example, a laptop may access a video clip from an Internet website via a broadband card that is plugged into the laptop.

DETAILED DESCRIPTION OF PREFERRED EMBODIMENTS

The following detailed description refers to the accompanying drawings. The same reference numbers in different drawings may identify the same or similar elements.

As described below, an application hosted on a device (e.g., a laptop, a computer, a notepad, a cell phone, etc.) may interact with one or more broadband cards that are plugged into or otherwise connected to the device. The application may perform tests on the broadband card, configure the broadband card, and use the broadband card to establish a communication link with another device over a network.

In one implementation, the application may provide increased convenience to broadband card users, and may save application writer/distributors production/distribution cost. Because the application can handle different broadband card models/types, the user may avoid installing a vendor specific application to use a new broadband card model/type. The application writer/distributor may avoid providing the upgraded application to users who wish to use the new broadband card model/new type of broadband card. Because new broadband card types/models are often released into the market, the increased convenience and cost savings can be significant factors in purchasing/selling a particular application for managing and controlling broadband cards.

Figure 1:
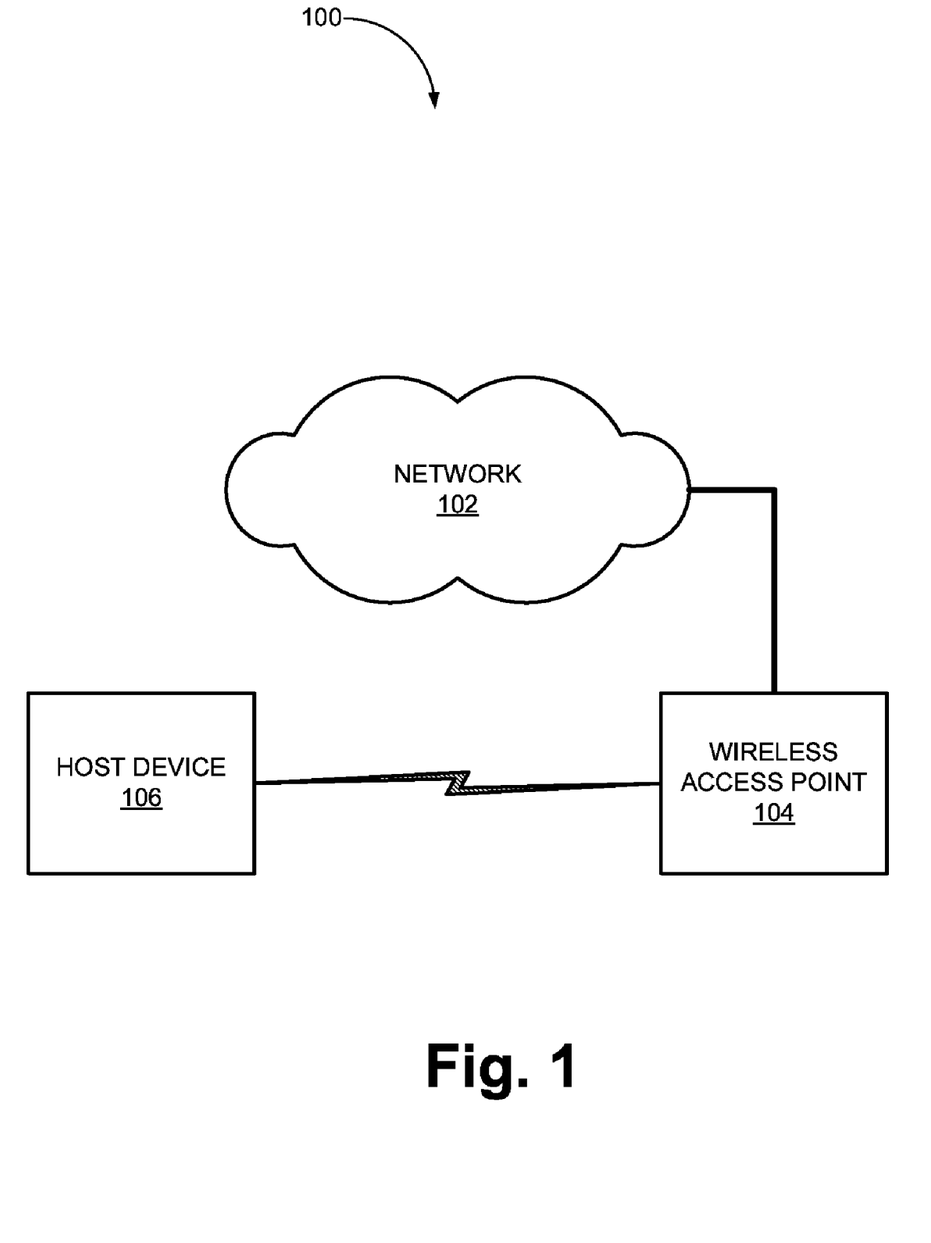
FIG. 1 shows an exemplary network in which concepts described herein may be implemented.

FIG. 1 is a diagram of exemplary network 100 in which concepts described herein may be implemented. As shown, network 100 may include a network 102, a wireless access point 104, and a host device 106. Depending on the implementation, network 100 may include additional, fewer, or different components than those illustrated in FIG. 1.

Network 102 may include the Internet, an intranet, a local area network (LAN), a wireless LAN (WLAN), a wide area network (WAN), a metropolitan area network (MAN), a cellular network, a public switched telephone network (PSTN), any other network, or a combination of networks.

Wireless access point 104 may include a device that operates as a gateway into network 102 for a device that establishes a wireless communication link with wireless access point (e.g., a cell tower, a base station, etc.). Host device 106 may communicate with another device in network 102 via wireless access point 104.

Host device 106 may include a device for hosting a broadband card and an application that use the broadband card (e.g., a laptop, a personal computer, an electronic notepad, a gaming device, etc.). Host device 106 may use the broadband card and the application to establish a communication link between wireless access point 104 and host device 106.

Figure 2:
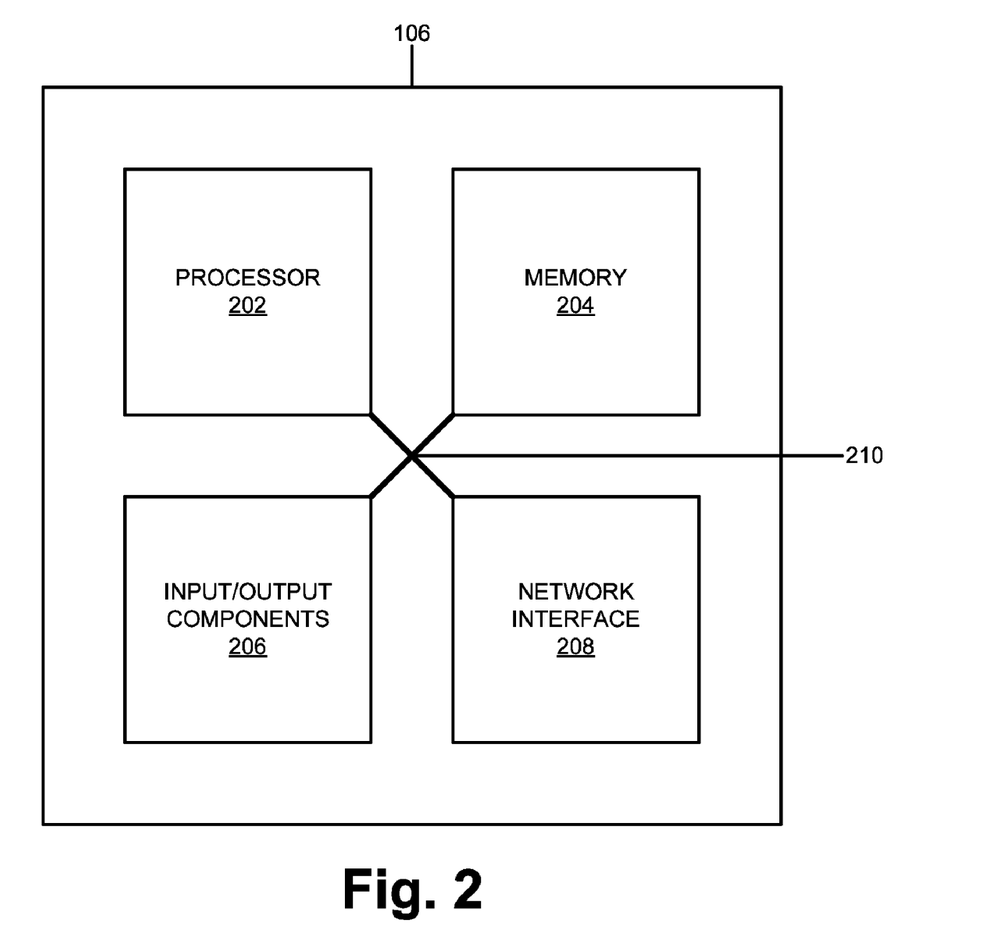
FIG. 2 is a block diagram of exemplary components of a host device of FIG. 1.

FIG. 2 is a block diagram of exemplary components of host device 106. As shown, host device 106 may include processor 202, memory 204, input/output components 206, a network interface 208, and a communication path 210. Depending on the implementation, host device 106 may include additional, fewer, or different components than those illustrated in FIG. 2.

Processor 202 may include a microprocessor, an Application Specific Integrated Circuit (ASIC), a Field Programmable Gate Array (FPGA), and/or other processing logic capable of controlling host device 106. Memory 204 may include static memory, such as read only memory (ROM), and/or dynamic memory, such as random access memory (RAM), or onboard cache, for storing data and machine-readable instructions. Memory 204 may also include computer-readable storage devices, such as a floppy disk, CD ROM, CD read/write (R/W) disc, and/or flash memory, as well as other types of storage devices configured to store computer-executable instructions.

Input/output components 206 may include a display screen, a keyboard, a mouse, a speaker, a microphone, a Digital Video Disk (DVD) writer, a DVD reader, Universal Serial Bus (USB), and/or other types of components for converting physical events or phenomena to and/or from digital signals that pertain to host device 106.

Network interface 208 may include transceiver-like mechanism that enables host device 106 to communicate with other devices and/or systems. For example, network interface 208 may include mechanisms for communicating via a network, such as the Internet, a terrestrial wireless network (e.g., a WLAN), a satellite-based network, etc. Additionally or alternatively, network interface 208 may include a modem, an Ethernet interface to a LAN, and/or an interface/connection for connecting host device 106 to other devices (e.g., a Bluetooth interface).

In one implementation, network interface 208 may include a broadband card plug-in assembly for establishing g a wireless communication link over which host device 106 may communicate with another device (e.g., a remote device). The broadband card plug-in assembly may include one or more hardware ports and broadband cards that communicate with the hardware ports. Once associated with a hardware port, the broadband cards may be managed and controlled via commands that are issued through the hardware ports.

Communication path 210 may provide an interface through which components of host device 106 can communicate with one another.

Figure 3:
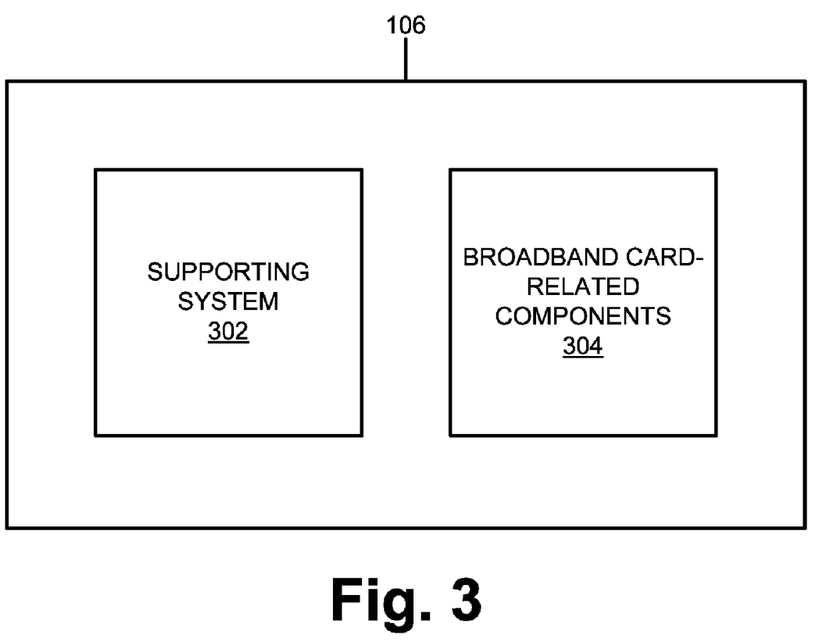
FIG. 3 is a block diagram of exemplary functional components of the host device of FIG. 1.

FIG. 3 is a block diagram of exemplary functional components of host device 106. As shown, host device 106 may include supporting system 302 and broadband card-related components 304. Depending on the implementation, host device 106 may include additional, fewer, or different components than those illustrated in FIG. 3. For example, host device 106 may include additional applications, such as, a word processing application, a multimedia application, etc.

Supporting system 302 may include a computer program (e.g., an operating system, a Windows Management Instrumentation (WMI), etc.) for managing hardware and software resources of host device 106 and for performing various support functions for applications executing on host device 106. For example, supporting system 302 may provide a TCI/IP stack to support a communication application. Supporting system 302 may also provide interfaces between the applications and the components in FIG. 2 (e.g., input/output components 206, network interface 208, etc.). Broadband card-related components 304 may include software components for managing and/or controlling different broadband card models (e.g., Verizon Broadband USB720 by Novatel Wireless, Sierra Compass 597USB Modem, Sierra Aircard 596, etc.) and/or different types of broadband cards installed on host device 106 (e.g., Evolution Data Only/Evolution Data Optimized (EVDO) cards, Global System for Mobile Communications (GSM) cards, etc.).

Figure 4:
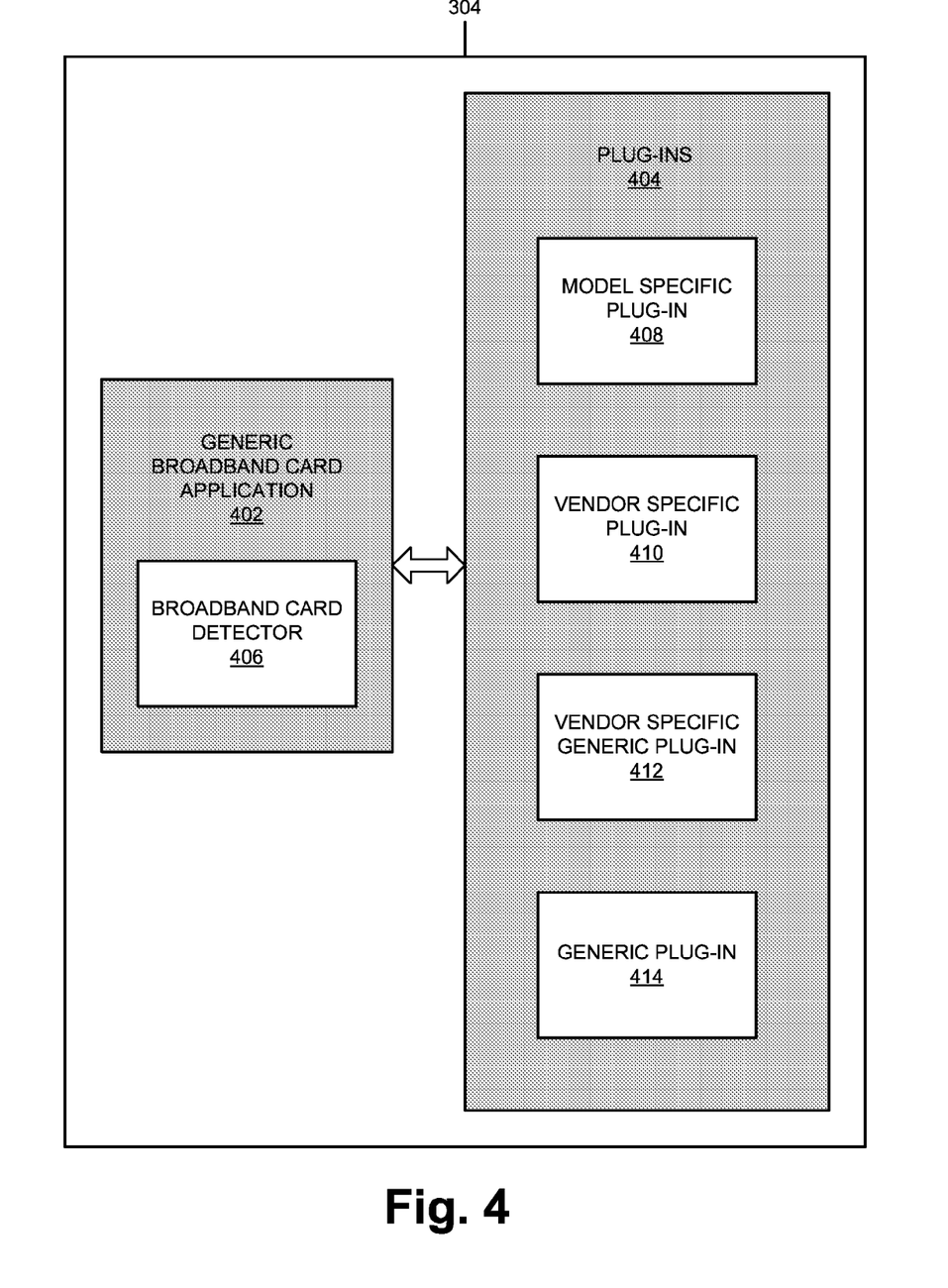
FIG. 4 is a block diagram of exemplary functional components of broadband card-related components of FIG. 3.

FIG. 4 is a block diagram of exemplary functional components of broadband card-related components 304. As shown, broadband card-related components 304 may include generic broadband card application 402 and plug-ins 404. Depending on the implementation, broadband card-related components 304 may include additional, fewer, or different components than those illustrated in FIG. 4.

Broadband application 402 may include a software component for testing a broadband card, configuring the broadband card, and establishing and using a wireless communication link via the broadband card. In establishing and using the communication link, broadband application 402 may use plug-ins 404. Plug-ins 404 (e.g., drivers) may include software components for managing and controlling individual broadband cards or groups of broadband cards. Typically, broadband card application 402 and plug-ins 404 may implement interfaces that allow broadband card application 402 and plug-ins 404 to interact with one another.

As further shown in FIG. 4, broadband card application 402 may include broadband card detector 406, and plug-ins 404 may include one or more of model specific plug-in 408, vendor specific plug-in 410, vendor specific generic plug-in 412, and generic plug-in 414.

Broadband card detector 406 may include logic for locating/detecting a broadband card inserted into host device 106. In detecting the broadband card, broadband card detector 406 may attempt to dynamically load model specific plug-in 408, vendor specific plug-in 410, vendor specific plug-in 412, or generic plug-in 414 until the broadband card is detected. For example, assume that a broadband card manufactured by New Era Communication, Inc. is inserted into host device 106. If dynamically loading model specific plug-in 408 results in a detection of the broadband card, no additional plug-in may be loaded. In one implementation, these plug-ins may be loaded sequentially. In other implementations, the plug-ins may be loaded in parallel.

Model specific plug-in 408 and vendor specific plug-in 410 may include software components for managing and controlling, respectively, a specific broadband card model and a set of broadband card models from a specific vendor. Typically, model specific plug-in 408 and vendor specific plug-in 410 may be provided by a specific vendor or manufacturer, and can use vendor specific interfaces to manage/control the broadband card.

Vendor specific generic plug-in 412 may include software components for controlling/managing different types of broadband cards. Depending on the implementation, vendor specific generic plug-in 412 can include custom-developed software that uses vendor specific interfaces. Typically, vendor specific generic plug-in 412 may operate like generic plug-in 414 (see below) in managing/controlling the broadband card, but via the vendor specific interfaces.

Generic plug-in 414 may include software components for managing and controlling different broadband cards for which model specific plug-in 408, vendor specific plug-in 410, or vendor specific generic plug-in 412 is not available or installed on host device 106.

As used herein, vendor specific generic plug-in 412 and/or generic plug-in 414 may be referred to as "generic plug-in." In addition, depending on the context, description that applies to generic plug-in 414 may also apply to vendor-specific generic plug-in 412.

Figure 5:
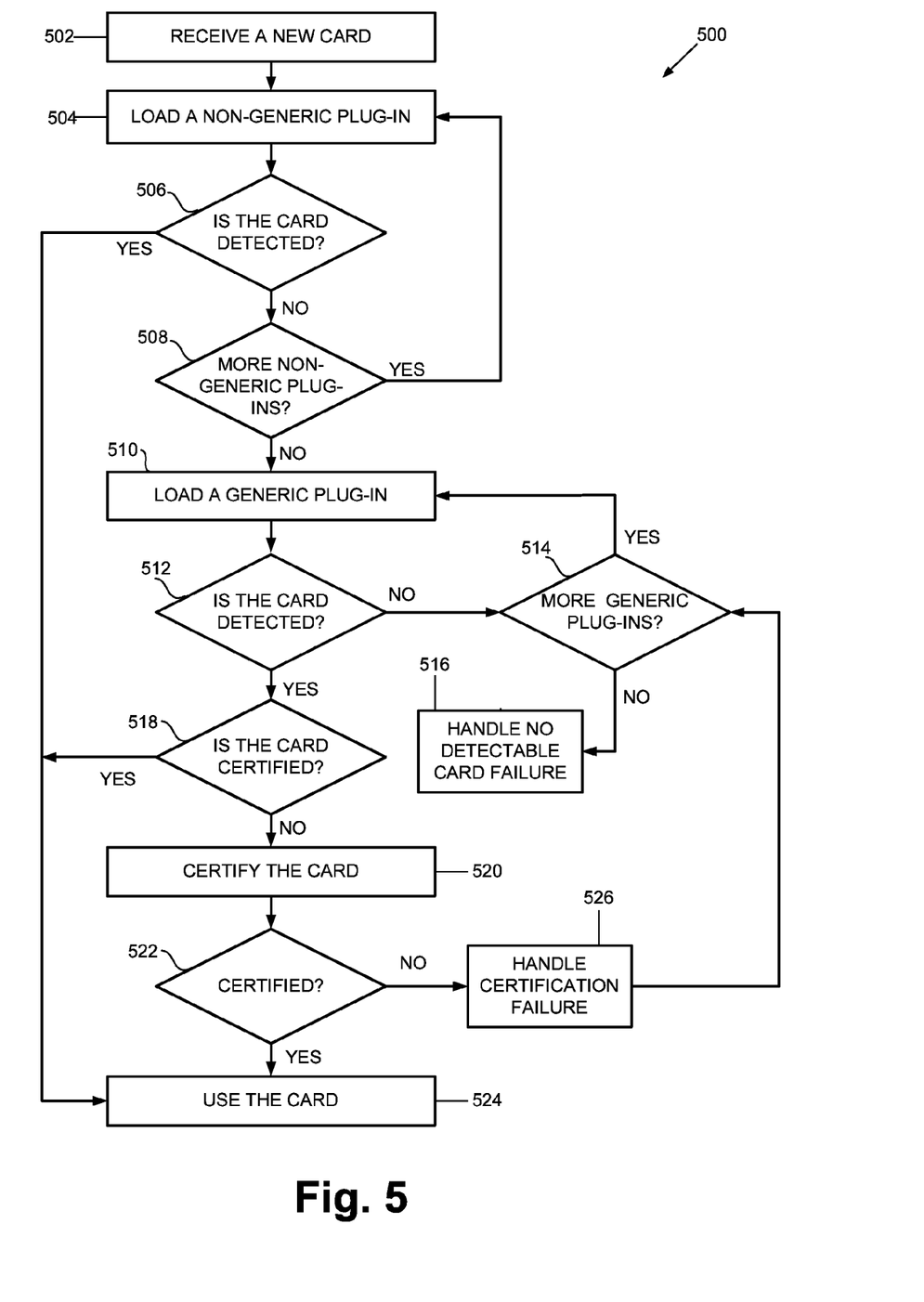
FIG. 5 is a flow diagram of an exemplary process for managing and controlling a broadband card.

FIG. 5 is a flow diagram of an exemplary process 500 for managing and controlling a broadband card. Process 500 may start when a host device 106 receives a new broadband card (block 502). The new broadband card may be received by host device 106 when a user plugs in the card into a hardware port of host device 106 or otherwise establishes a connection between the broadband card and the hardware port.

A non-generic plug-in may be loaded (block 504). As used herein, the term "non-generic plug-in" may refer to model specific plug-in 408 or vendor specific plug-in 410. In one implementation, broadband card detector 404 may load the non-generic plug-in to detect a new card. The loaded non-generic plug-in may query supporting system 302 in host device 106 (e.g., an operating system, Windows Management Instrumentation, etc.) to determine if the non-generic plug-in supports the broadband card. Alternatively, broadband card detector 406 may load the non-generic plug-in when supporting system 302 (FIG. 3) informs generic broadband card application 402 or broadband card detector 406 that a new piece of hardware is attached to host device 106.

If the non-generic plug-in detects the broadband card (block 506—YES), generic broadband card application 402 and/or the non-generic plug-in may use the broadband card (block 524). For example, if model specific plug-in 408 detects the broadband card, model-specific plug-in may 408 use the broadband card to establish a wireless communication link to wireless access point 104. In another example, if vendor specific generic plug-in 410 detects the broadband card, broadband card application 402 may configure the broadband card based on parameters that are input by the user (e.g., connect to a server based on a server name that is input by the user).

If the non-generic plug-in does not detect the broadband card (block 506—NO), broadband card detector 406 may determine whether host device 106 includes more non-generic plug-ins (block 508). If host device 106 includes more non-generic plug-ins (block 508—YES), process 500 may return to block 504 to load another non-generic plug-in.

In the above, blocks 504, 506, and 508 may form a loop in which each of non-generic plug-ins is dynamically loaded in sequence to detect the broadband card. In one implementation, the loop may load the non-generic plug-ins in the following order: model specific plug-in 408 and vendor specific plug-in 410. This process may continue for a number of different vendors/broadband card models.

If host device 106 does not include more non-generic plug-ins (block 508—NO), broadband card detector 406 may dynamically load a generic plug-in (e.g., vendor specific generic plug-in 412 or generic plug-in 414) (block 510).

At block 512, it may be determined if the broadband card is detected (block 512). If the generic plug-in does not detect the broadband card (block 512—NO), process 500 may proceed to block 514, to determine if there is another generic plug-in (block 514). Furthermore, if there is another generic plug-in (block 514—YES), process 500 may return to 510, to load in the other generic plug-in. If host device 106 does not include another generic plug-in (block 514—NO), process 500 may proceed to block 516, where generic broadband card application 402 may handle the failure to detect a broadband card (e.g., "no detectable card" failure). For example, generic broadband card application 402 may indicate, via a graphical user interface, that generic broadband card application 402 or the generic plug-in failed to detect a broadband card.

If the broadband card is detected (block 512—YES), it may be determined whether the broadband card is certified (block 518). A card that is "certified" may support a set of predetermined interfaces for managing and controlling the card. In one implementation, a generic plug-in may determine whether the broadband card is certified by looking up an identifier (e.g., a model number) associated with the card in a database that stores certification records. The certification record from the lookup may indicate whether the broadband card has been certified during the card's previous use in host device 106.

If the broadband card is certified (block 518—YES), process 500 may proceed to block 524, where generic broadband card application 402 or the generic plug-in may use the broadband card. If the card is not already certified (block 518—NO), generic broadband card application 402/the generic plug-in may perform a certification test (block 520). In performing the certification test, broadband application 402/the generic plug-in may invoke each of a set of predetermined interfaces that are used to manage/control the broadband card and detect whether each invocation return an error value.

To start the certification test, generic broadband card application 402/the generic plug-in may establish communication with the broadband card. This may entail making multiple calls to supporting system 302. For example, when the broadband card is connected to host device 106, the broadband card may present itself as a modem to supporting system 302. Consequently, for generic broadband card application 402/the generic plug-in to interact with the broadband card, generic broadband card application 402/the generic plug-in may need to access the broadband card's command port and data port. Because different broadband cards may designate their command/data ports differently, generic broadband card application 402/generic plug-in 414 may query supporting system 302 (e.g., an operating system, a Windows Management Instrumentation, etc.) to locate the command/data port of the broadband card. Furthermore, in certain instances, generic broadband card application 402/the generic plug-in may query supporting system 302 multiple times (e.g., twice) to determine whether the command port/data port is a Universal Serial Bus (USB) port or a Personal Computer Memory Card International Association (PCMCIA) port, etc.

In the above, in responding to the commands, different broadband cards may provide outputs in different formats. To correctly interpret the outputs, generic broadband card application 402 may include a parser that scans the outputs.

It may be determined whether performing the certification test certifies the card (block 522). The card may be deemed certified if no error value is returned for invoking a subset of the interfaces that are necessary for using the broadband card. For example, if a card fails to respond correctly to a command that is not important for its use, the card may be deemed certified. The failed command may be disabled from further use.

When the card is deemed certified, a result of the certification test may be stored in a database of certification records. If the same broadband is card is pulled out and, at a later time, reconnected into host device 106, generic broadband application 402 or a generic plug-in may perform a lookup in the database based on an identifier associated with the broadband card.

If the card is certified (block 522—YES), process 500 may proceed to block 524, to use the broadband card. If the card is not certified (block 522—NO), process 500 may proceed to block 526, where generic broadband card application 402 or a generic plug-in may handle the failure to certify the card. For example, the generic plug-in may indicate, via a graphical user interface, that the broadband card failed the certification test and that the generic plug-in is unable to use the card for broadband communication.

In the above, as process 500 proceeds through various blocks in FIG. 5, generic broadband card application 402 may display a list of broadband cards that are detected, a list of broadband cards that failed the certification test, a list of commands that a certified card does not support, and/or other relevant information related to detection and/or use of the broadband cards.

In the above, some blocks in FIG. 5 have been described as being performed by a generic plug-in (e.g., vendor specific generic plug-in 412 or generic plug-in 414) or by generic broadband card application 402. However, in a different implementation, those blocks may be performed by a different component. For example, in the above example, a generic plug-in is described as handling a failure to certify the broadband card at block 526. In a different implementation, generic broadband card application 402 may handle the failure to certify the card.

Figure 6:
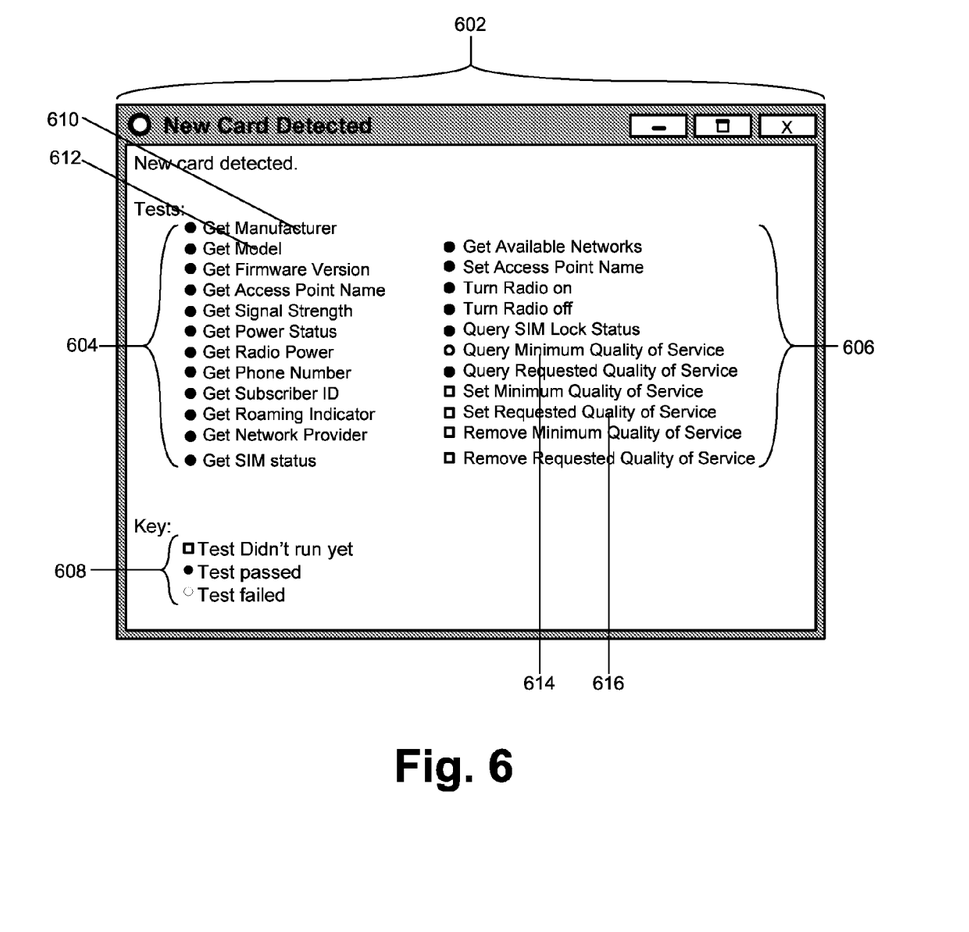
FIG. 6 illustrates an exemplary window of a graphical user interface (GUI) of a generic broadband card application of FIG. 4.

FIGS. 6-9 illustrate a number of exemplary graphical user interfaces (GUIs) associated with broadband card application 402. FIG. 6 illustrates an exemplary test window 602 of the GUI. As shown, window 602 may include commands 604 and 606 and keys 608. Window 602 may pop up when application 402 is running in background or when the user starts application 402, to alert the user about a status of the broadband card. Depending on the implementation, window 602 may include additional, fewer, or different components than those illustrated in FIG. 6.

Commands 604 and 606 may include commands that generic broadband card application 402 issues to the broadband card to certify the broadband card. For example, generic broadband card application 402 may issue Get Manufacturer command 610 to the broadband card and wait for a valid response. Other commands, such as Get Access Point Name (e.g., a name of a network or a device to which the broadband card may connect), Set Access Point Name, etc. may be issued similarly. Although FIG. 6 shows 24 different commands, in a different implementation, commands 604 and 606 may include additional, fewer, or different commands than the ones illustrated in FIG. 6.

Keys 608 explain the meaning of a symbol that is placed before each command in commands 604 and 606. □, ●, and ○ symbols may indicate, respectively, that a corresponding command has not yet been tested, the corresponding command has been successfully completed for the broadband card, and the corresponding command has unsuccessfully completed. For example, the ● symbol before Get Model command 612 may indicate that application 402 is able to issue command 612 to the broadband card and obtain an identifier that is associated with the broadband card model. In another example, the ○ symbol before Query Minimum Quality of Service (QoS) command 614 may indicate that application 402 is unable to obtain a valid response in to command 614. In yet another example, the □ symbol before Set Minimum QoS command 616 may indicate that application 402 has not yet tested command 616.

Figure 7:
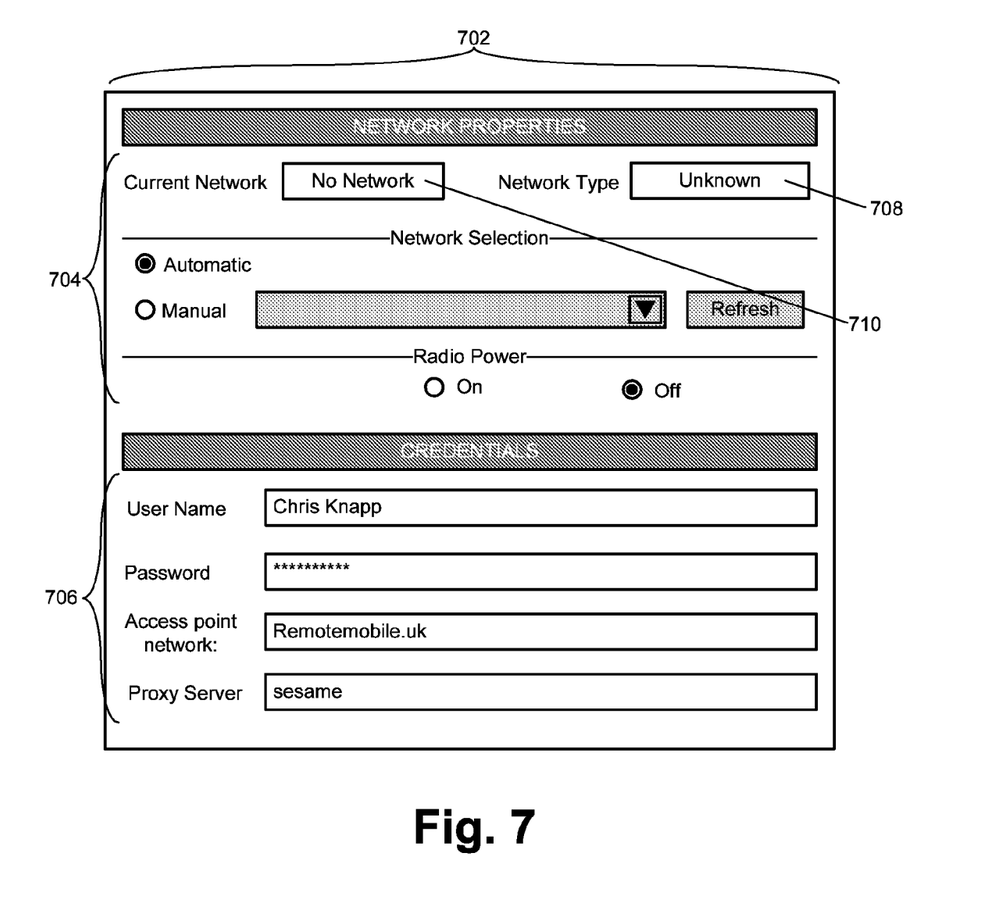
FIG. 7 illustrates another exemplary window of the GUI.

FIG. 7 illustrates an exemplary window 702 of the GUI for generic broadband card application 402. As shown, network access window 702 may include a network properties section 704 and a user credentials section 706.

Network properties section 704 may include GUI components that describe properties of a network to which the broadband card has or is to establish communication. Although network properties section 704 is shown as including different components, only a Current Network textbox 708 and a Network Type textbox 710 are described below for purposes of simplicity.

Current Network textbox 708 may include a GUI component (e.g., a textbox component) in which the name of network to which the broadband card has established communication is displayed. Generic broadband card application 402 may establish the communication, either automatically or when the user directs application 402 to establish the communication, via a certified broadband card. Network Type textbox 710 may include a GUI component in which the type of network to which the broadband card has established a communication link is displayed. For example, Network Type textbox 710 may designate that the network is a General Packet Radio Service (GPRS) network, Universal Mobile Telecommunications System (UMTS) network, High-Speed Downlink Packet Access (HSDPA) network, EVDO network, etc.

User credentials section 706 may include GUI components that display parameters that are association with authenticating the user to access the network, such as a user name, a user password, etc.

Figure 8:
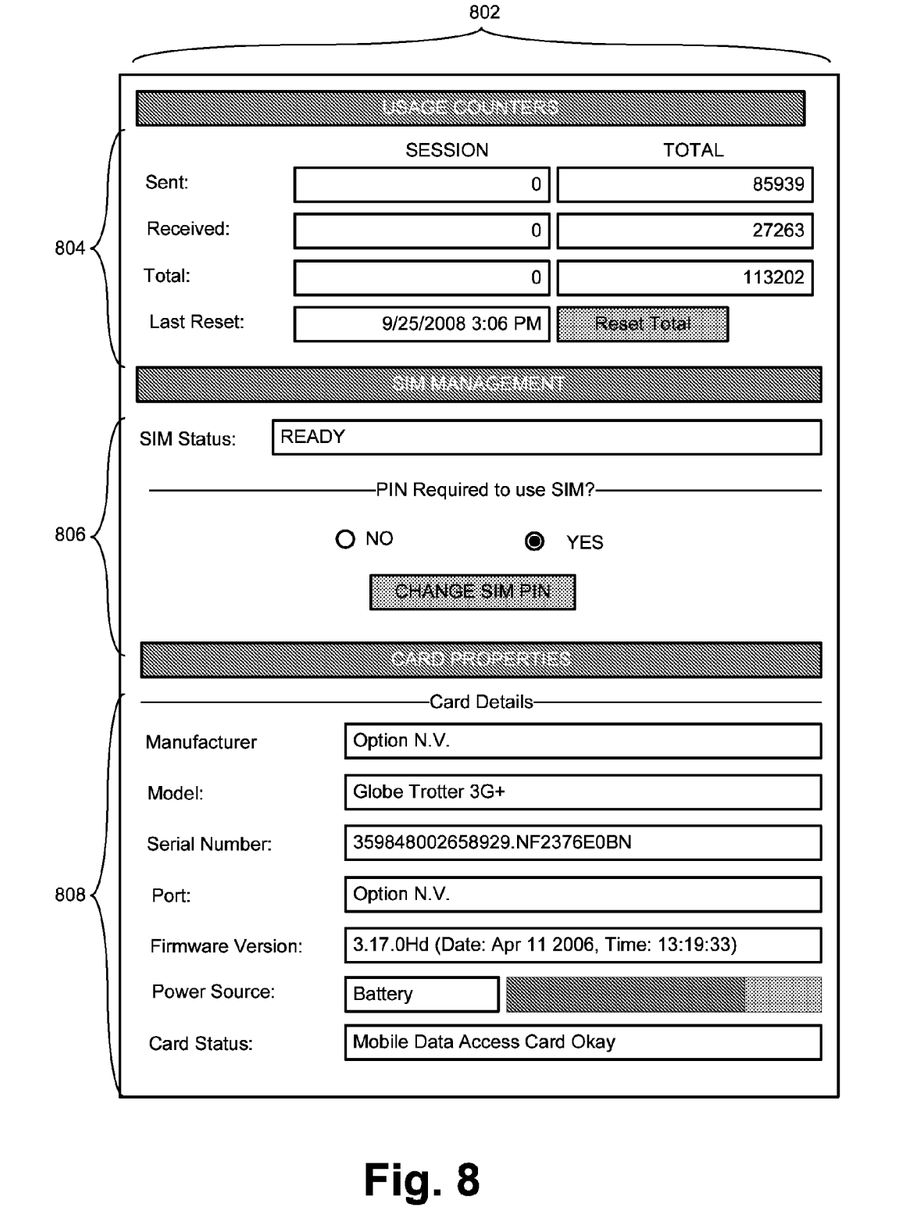
FIG. 8 illustrates yet another exemplary window of the GUI.

FIG. 8 illustrates another window 802 of the GUI for generic broadband card application 402. As shown, window 802 may include a Usage information section 804, a Subscriber Identity Module (SIM) card section 806, and Card Properties section 808.

Usage information section 804 may display information that is related to communication sessions associated with the broadband card. For example, usage information section 804 may show the number of bytes that have been sent during the current communication session, the number of bytes that have been received, etc. SIM card section 806 may show information about the status of the broadband card, such as whether the broadband card is ready for use, whether a personal identification number (PIN) needs to be input to use the card, etc. Card properties section 808 may display properties that are associated with the broadband card, such as the name of broadband card manufacturer, an identifier associated with the broadband card model, etc.

Above, some of the components of window 802 may be associated with specific commands that are shown as being tested in FIG. 6. For example, in Card Properties section 808, a model number and a name of the broadband card manufacturer may be obtained by issuing Get Model command 612 and Get Manufacturer command 610, respectively, to the broadband card.

Figure 9:
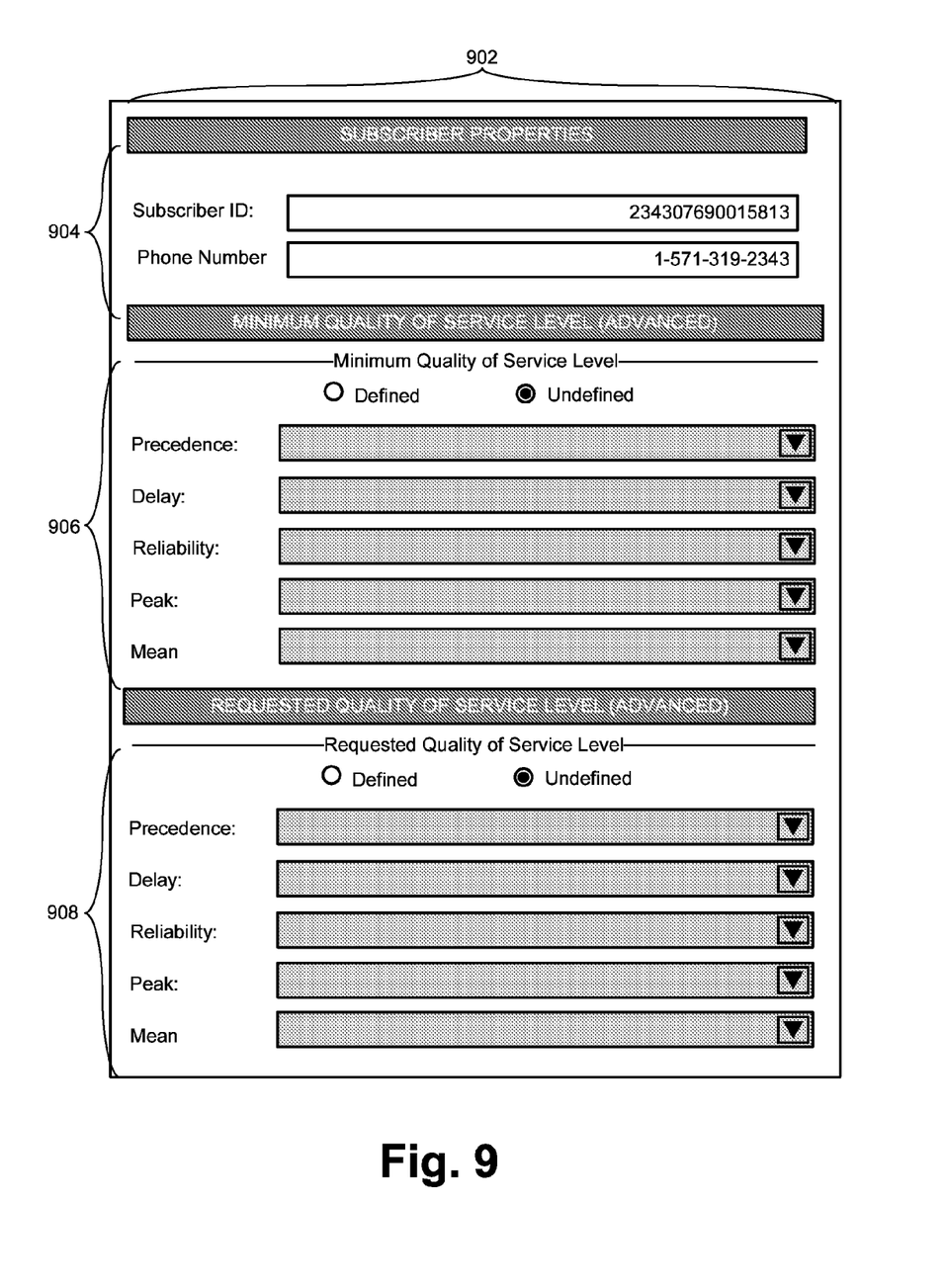
FIG. 9 illustrates still another exemplary window of the GUI.

FIG. 9 illustrates yet another exemplary window 902 of the GUI for generic broadband card application 402. As shown, window 902 may include a Subscriber Properties section 904, a Minimum QoS section 906, and a Requested QoS section 908.

Subscriber Properties section 904 may include information that pertains to a service to which the user subscribes (e.g., a phone number, a subscriber identifier, etc.). Minimum QoS section 906 and Requested QoS 908 may display information that is related to the minimum quality of service and a requested quality of service, such as the minimum network delay, an average reliability (e.g., an error rate), etc.

In the above, FIGS. 6-9 illustrate a number of exemplary windows of the GUI for generic broadband card application 402 as having certain components and sections. In a different implementation, windows 602-902 may include additional, fewer, or different components and/or sections than those illustrated in FIGS. 6-9.

In the above, generic broadband card application 402 and associated components (e.g., broadband card detector 406, generic plug-in 414, etc.) may provide increased convenience to broadband card users, and save application writer/distributors production/distribution cost typically associated with broadband card development and distribution. Because application 402 and the associated components can handle different broadband card models/types, the user may avoid installing a vendor specific application or a plug-in to use a new broadband card model/type. The application writer/distributor may avoid providing the upgraded application/plug-in to users who wish to use the new broadband card model/new type of broadband card. Because new broadband card types/models are often released into the market, the increased convenience and cost savings can be significant factors in purchasing/selling a particular application/plug-in for managing and controlling broadband cards.

Foregoing description of implementations provides an illustration, but is not intended to be exhaustive or to limit the implementations to the precise form disclosed. Modifications and variations are possible in light of the above teachings or may be acquired from practice of the teachings.

For example, while a series of blocks have been described with regard to the process illustrated in FIG. 5, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed in a network device, the method comprising:
   receiving a broadband card;
   loading one or more model-specific plug-ins, provided in the network device, in a broadband card detector;
   determining that none of the one or more model-specific plug-ins detect the broadband card;

determining that no other model-specific plug-in is provided in the network device;

loading, upon the determination that no other model-specific plug-in is provided in the network device, a vendor-specific plug-in associated with a particular vendor and provided in the network device, in the broadband card detector;

determining that the vendor-specific plug-in fails to detect the broadband card;

loading, when the vendor-specific plug-in fails to detect the broadband card, at least one other vendor-specific plug-in associated with at least one other vendor and provided in the network device, in the broadband card detector;

determining that the at least one other vendor-specific plug-in fails to detect broadband card;

determining that no other vendor-specific plug-in is provided in the network device;

loading, upon the determination that no other vendor-specific plug-in is provided in the network device, at least one of a vendor-specific generic plug-in or a generic plug-in in the broadband card detector; and using the at least one of the vendor-specific generic plug-in or the generic plug-in to certify the broadband card.

2. The method of claim 1, further comprising:

receiving user input to accept parameters for establishing a communication link to a network using the broadband card;

configuring the broadband card; or establishing communication with a network using the broadband card.

3. The method of claim 1, wherein using the at least one of the vendor-specific generic plug-in or the generic plug-in to certify the broadband card includes:

issuing a command to the broadband card and determining if the broadband card provides a valid response to the command.

4. The method of claim 3, wherein issuing a command includes:

setting an access point name at the broadband card; or obtaining an access point name from the broadband card.

5. The method of claim 1, further comprising:

determining whether the broadband card has been previously certified by looking up a database of certification records; and using the broadband card if the broadband card has been previously certified.

6. The method of claim 1, further comprising:

storing a result of certifying the broadband card in a database of certification records.

7. The method of claim 1, wherein using the generic plug-in to certify the broadband card includes:

locating a command port to which to issue commands to the broadband card; or locating a serial port to send data to the broadband card.

8. The method of claim 1, wherein loading at least one of the vendor-specific generic plugin or the generic plug-in includes:

loading the vendor-specific generic plug-in having vendor-specific interfaces for controlling the broadband card, and loading the generic plug-in having no vendor-specific interfaces for controlling the broadband card.

9. The method of claim 1, wherein using the generic plug-in to certify the broadband card includes:

using a parser to interpret output of the broadband card when the broadband card responds to a certification test.

10. The method of claim 1, wherein the one or more model-specific plug-ins and the vendor-specific plug-ins comprise a non-generic plug-in, the method further comprising:

sending one or more queries to an operating system to determine whether the non-generic plug-in supports the broadband card.

11. The method of claim 1, wherein loading the at least one of the vendor-specific generic plug-in or a generic plug-in comprises:

loading one or more vendor-specific generic plug-ins in the broadband detector, determining that none of the one or more vendor-specific generic plug-ins detect the broadband card;

determining that no other vendor-specific generic plug-in is provided in the network device; and loading, upon the determination that no other vendor-specific generic plug-is provided in the network device, the generic plug-in in the broadband card detector.

* * * * *